United States Patent
Yin et al.

(10) Patent No.: US 9,712,015 B2
(45) Date of Patent: Jul. 18, 2017

(54) MOTOR OF A CEILING FAN

(71) Applicant: Sunonwealth Electric Machine Industry Co., Ltd., Kaohsiung (TW)

(72) Inventors: Tso-Kuo Yin, Kaohsiung (TW); Duo-Nian Shan, Kaohsiung (TW); Bo-Wei Chiou, Kaohsiung (TW); Yu-Yuan Lu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 148 days.

(21) Appl. No.: 14/644,245

(22) Filed: Mar. 11, 2015

(65) Prior Publication Data

US 2015/0333592 A1    Nov. 19, 2015

(30) Foreign Application Priority Data

May 15, 2014  (TW) .............................. 103117188 A

(51) Int. Cl.
| | | |
|---|---|---|
| *H02K 5/173* | (2006.01) | |
| *H02K 5/16* | (2006.01) | |
| *F16C 35/063* | (2006.01) | |
| *H02K 5/24* | (2006.01) | |
| *H02K 5/04* | (2006.01) | |
| *H02K 7/00* | (2006.01) | |
| *F04D 25/06* | (2006.01) | |

(Continued)

(52) U.S. Cl.
CPC ............ *H02K 5/165* (2013.01); *F04D 25/062* (2013.01); *F04D 25/088* (2013.01); *F16C 35/063* (2013.01); *H02K 5/04* (2013.01); *H02K 5/1737* (2013.01); *H02K 5/24* (2013.01); *H02K 7/003* (2013.01); *F16C 35/06* (2013.01); *H02K 5/173* (2013.01)

(58) Field of Classification Search
CPC ...... F04D 25/08; H02K 5/173; H02K 5/1677; H02K 5/1737; H02K 5/165
USPC ..... 310/90, 68 R, 67 R; 384/569; 417/424.1, 417/423.7, 423.12
See application file for complete search history.

(56) References Cited

U.S. PATENT DOCUMENTS

| | | | | |
|---|---|---|---|---|
| 3,899,702 | A * | 8/1975 | Hanna ................... | H02K 23/04 310/154.04 |
| 4,073,598 | A * | 2/1978 | Mizutani ............ | F04D 25/0613 416/170 R |

(Continued)

FOREIGN PATENT DOCUMENTS

| | | | | |
|---|---|---|---|---|
| DE | 102004001942 | A1 * | 8/2005 | ............. F04D 29/04 |
| GB | 2114818 | A * | 8/1983 | ................ H02K 1/28 |

(Continued)

*Primary Examiner* — Burton Mullins
(74) *Attorney, Agent, or Firm* — Alan D. Kamrath; Kamrath IP Lawfirm, P.A.

(57) ABSTRACT

A motor of a ceiling fan includes: a shaft having two shoulder surfaces facing in opposite axial directions of the shaft, with the shaft coupling with a stator; and a bearing sleeve receiving two bearings for supporting the shaft, with an annular flange formed at an end of the bearing sleeve. The annular flange and one of the shoulder surfaces of the shaft clamp and position one of the bearings. A rotor has a housing coupling with the bearing sleeve, with the housing having a connecting portion. The connecting portion and the other one of the shoulder surfaces of the shaft clamp and position the other one of the bearings.

20 Claims, 8 Drawing Sheets

(51) Int. Cl.
*F04D 25/08* (2006.01)
*F16C 35/06* (2006.01)

(56) References Cited

U.S. PATENT DOCUMENTS

| | | | | |
|---|---|---|---|---|
| 4,505,031 A * | 3/1985 | Colwell | ............... | H02K 5/1677 |
| | | | | 29/596 |
| 4,621,977 A * | 11/1986 | Markwardt | ........... | F04D 25/088 |
| | | | | 416/170 R |
| 5,818,133 A * | 10/1998 | Kershaw | ................ | F16C 21/00 |
| | | | | 310/64 |
| 5,883,449 A * | 3/1999 | Mehta | ................... | F04D 25/082 |
| | | | | 310/417 |
| 6,379,116 B1 * | 4/2002 | Tai | ..................... | F04D 25/0613 |
| | | | | 416/210 R |
| 7,157,872 B1 * | 1/2007 | Tang | .................... | F04D 25/088 |
| | | | | 318/400.41 |
| 7,175,392 B2 | 2/2007 | Steiner | | |
| 7,612,475 B2 * | 11/2009 | Yao | ...................... | F04D 25/088 |
| | | | | 310/67 R |
| 7,615,898 B2 | 11/2009 | Chang | | |
| 2008/0169732 A1 | 7/2008 | Chang | | |
| 2010/0109465 A1 | 5/2010 | Yang et al. | | |
| 2012/0194112 A1 | 8/2012 | Purohit | | |
| 2013/0076213 A1 * | 3/2013 | McCloud | ................ | H02K 5/00 |
| | | | | 310/75 D |

FOREIGN PATENT DOCUMENTS

| | | |
|---|---|---|
| JP | H05300715 A | 11/1993 |
| WO | WO2012103166 A2 | 8/2012 |

* cited by examiner

MOTOR OF A CEILING FAN

BACKGROUND OF THE INVENTION

1. Field of the Invention

The present invention generally relates to a motor of a ceiling fan and, more particularly, to a motor able to receive a plurality of bearings by one bearing sleeve.

2. Description of the Related Art

Referring to FIG. 1, a conventional motor of a ceiling fan, with a reference number of "9," of U.S. Pat. No. 7,615,898 entitled as "INTEGRATED STATOR AND ROTOR FOR A DC BRUSHLESS CEILING FAN MOTOR", is shown and includes a stator 91 and a rotor 92. The stator 91 has a core 911, a plurality of coils 912 wound on the core 911, and a shaft 913 passing through the core 911. The rotor 92 has an upper shield 921, a lower shield 922 and a waist ring 923 sandwiched by the upper and lower shields 921, 922. Each of the upper and lower shields 921, 922 combines with a bearing 924 for the shaft 913 to couple with, and the stator 91 is received in a room defined by the upper shield 921, the lower shield 922 and the waist ring 923.

Specifically, since the rotor 92 couples with the shaft 913 of the stator 91 via the bearing 924, the shaft 913 has to connect with the bearing 924 by a press fit, so that the rotor 92 can rotate around the stator 91 stably and so that an inner ring of the bearing 924 cannot rotate relatively to the shaft 913. In other words, the bearing 924 has to be mounted onto the shaft 913 by a huge pressure in manufacture to achieve the press fit condition between the shaft 913 and bearing 924, and, thus, a special machine or time-consumptive procedure to produce this huge pressure is required. Therefore, the process for manufacturing the motor 9 is thus complicated and time consumptive. Besides, the awkwardly big-sized motor 9 also increases the difficulty in assembly and thus raises the manufacture cost.

Moreover, the vibration caused by the operation of the rotor 92 can easily transmit to the shaft 913 via the bearing 924 due to the press fit between the shaft 913 and the bearing 924, and thus affects the electronic members inside the stator 91 or other members connecting with the shaft 913. This vibration may therefore largely raise the failure rate of these members, and further decrease the lifetime of the motor 9.

In sum, there are drawbacks such as a complicated manufacture process and a short lifetime of the motor 9, and, thus, an improved motor for ceiling fan is required.

SUMMARY OF THE INVENTION

What is needed is a motor of a ceiling fan, which does not connect the bearings to the shaft by a press fit, to simplify the assembling steps.

Another need is a motor having a buffer member to damp the vibration during operation and which prevents members from damage due to the vibration, to extend the lifetime of the motor.

In one implementation, a motor of a ceiling fan includes: a shaft having two shoulder surfaces facing in opposite axial directions of the shaft, with the shaft coupling with a stator; and a bearing sleeve receiving two bearings for supporting the shaft, with an annular flange formed at an end of the bearing sleeve. The annular flange and one of the two shoulder surfaces of the shaft clamp and position one of the two bearings. A rotor has a housing coupling with the bearing sleeve, with the housing having a connecting portion. The connecting portion and the other one of the shoulder surfaces of the shaft clamp and position the other one of the two bearings.

In this implementation, one or more of the following features may be included that: the housing has a base, the two shoulder surfaces of the shaft are a first shoulder surface and a second shoulder surface, and the first shoulder surface faces the base and is disposed between the base and the second shoulder surface; the shaft has a thick section, and the first and second shoulder surfaces are two ends faces of the thick section; each of the two bearings has an inner ring and an outer ring, the bearing sleeve connects with outer peripheries of the outer rings, and the shaft extends through the inner rings; the bearing sleeve has a receiving room inside, both of the two bearings are received in the receiving room, the bearing sleeve further has a first opening and a second opening respectively formed at two opposite ends of the bearing sleeve and communicating with the receiving room, the first shoulder surface faces the first opening, and the second shoulder surface faces the second opening; a center of the base has a through hole aligning with the first and second openings in the axial direction of the shaft; the connecting portion connects with the base, the two bearings are a first bearing and a second bearing, the first shoulder surface abuts against the inner ring of the first bearing, the second shoulder surface abuts against the inner ring of the second bearing, the connecting portion abuts against the outer ring of the first bearing, the first bearing is thus clamped and positioned between the connecting portion and the first shoulder surface, the annular flange abuts against the outer ring of the second bearing, and the second bearing is thus clamped and positioned between the annular flange and the second shoulder surface; the inner edge of the base with which the connecting portion connects defines the through hole, the connecting portion extends from the base into the first opening and abuts against the first bearing, the annular flange defines the second opening and radially extends inwards to the shaft to abut against the second bearing; a buffer member is arranged between the connecting portion and the first bearing, and two opposite sides of the buffer member abut against the connecting portion and the first bearing respectively; the bearing sleeve has a first coupling portion, and the base has a second coupling portion aligned with the first coupling portion to combine the housing with the bearing sleeve; the first coupling portion is arranged adjacent to the first opening of the bearing sleeve and has a plurality of holes, the second coupling portion has a plurality of through holes aligning with the holes of the first coupling portion respectively, and a plurality of fixing members extends through the through holes and is firmly coupled with the walls of the holes of the first coupling portion; the housing has an extending portion connecting with the inner edge of the base, the extending portion extends in the axial direction of the shaft from the base to the second opening of the bearing sleeve, the connecting portion couples with the extending portion, the two bearings are a first bearing and a second bearing, the first shoulder surface abuts against the inner ring of the first bearing, the second shoulder surface abuts against the inner ring of the second bearing, the connecting portion abuts against the outer ring of the second bearing, the second bearing is thus clamped and positioned between the connecting portion and the second shoulder surface, the annular flange abuts against the outer ring of the first bearing, and the first bearing is thus clamped and positioned between the annular flange and the first shoulder surface; the connecting portion couples with an end of the extending portion away from the base, extends into the second opening, and abuts against the second bearing, and the annular flange defines the first opening and radially extends inwards from the bearing sleeve to the shaft to abut against the first bearing; a buffer member is arranged between the connecting portion and the second bearing, with two opposite sides of the buffer member abutting against the connecting portion and the second bearing respectively; the bearing sleeve has a first coupling portion, and the extending portion has a third coupling portion aligning with the first coupling portion to combine the housing and the bearing sleeve; the first coupling portion is arranged adjacent to the second opening of the bearing sleeve and has a plurality of holes, the third coupling portion has a plurality of through holes aligning with the holes of the first coupling portion respectively, and a plurality of fixing members extends through the through holes and is firmly coupled with the walls of the holes of the first coupling portion; and the inner rings of the first and second bearings couple with the shaft in a non-press-fit way.

BRIEF DESCRIPTION OF THE DRAWINGS

The present invention will become more fully understood from the detailed description given hereinafter and the accompanying drawings which are given by way of illustration only, and thus are not limitative of the present invention, including.

Figure 1:
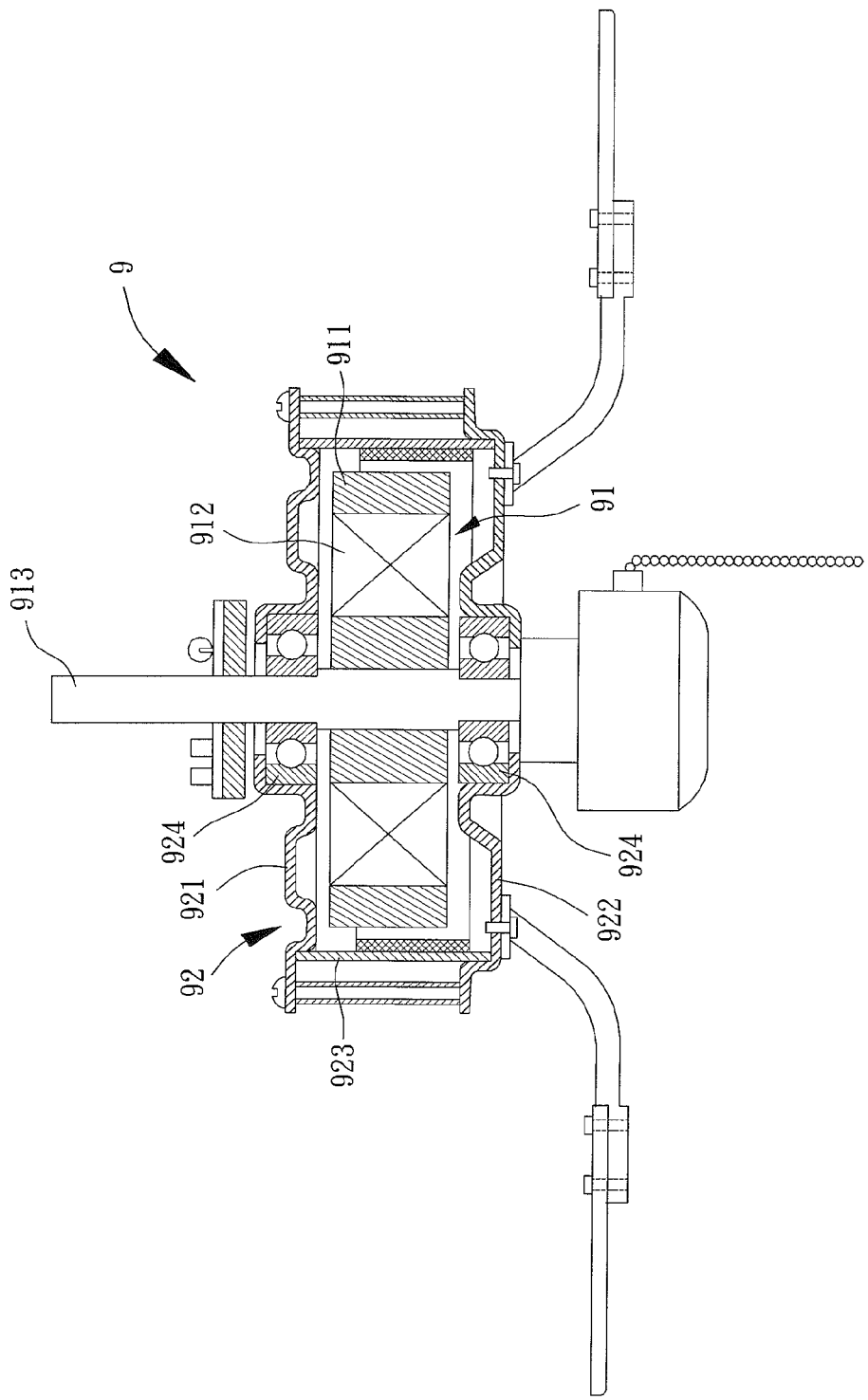
FIG. 1 is a cross-sectional view of a conventional motor of a ceiling fan.

In the various figures of the drawings, the same numerals designate the same or similar parts. Furthermore, when the term "first," "second," "third," "inner," "outer," and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
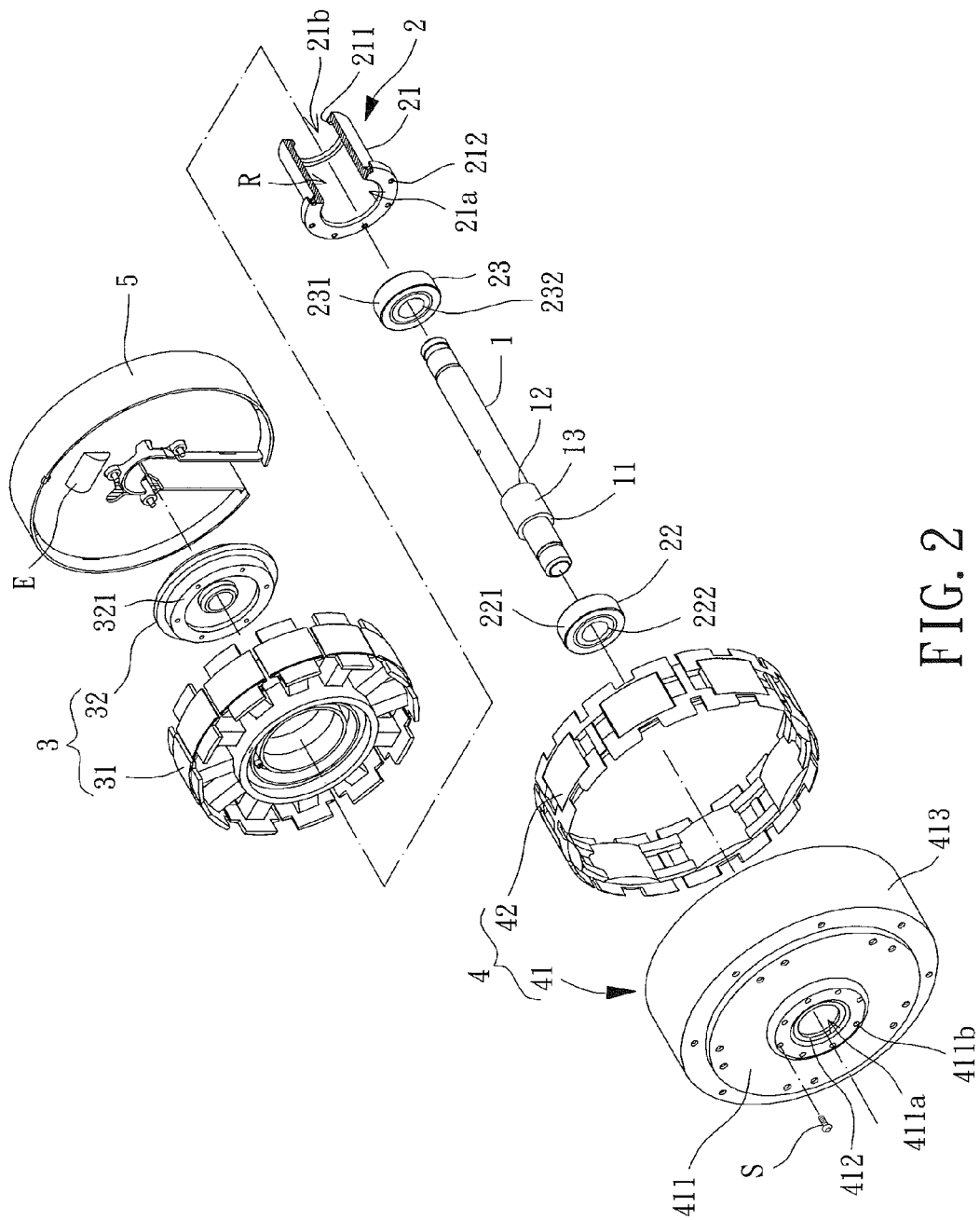
FIG. 2 is a perspective and exploded view of a motor of a ceiling fan in accordance with a first embodiment of the present disclosure.
Figure 3:
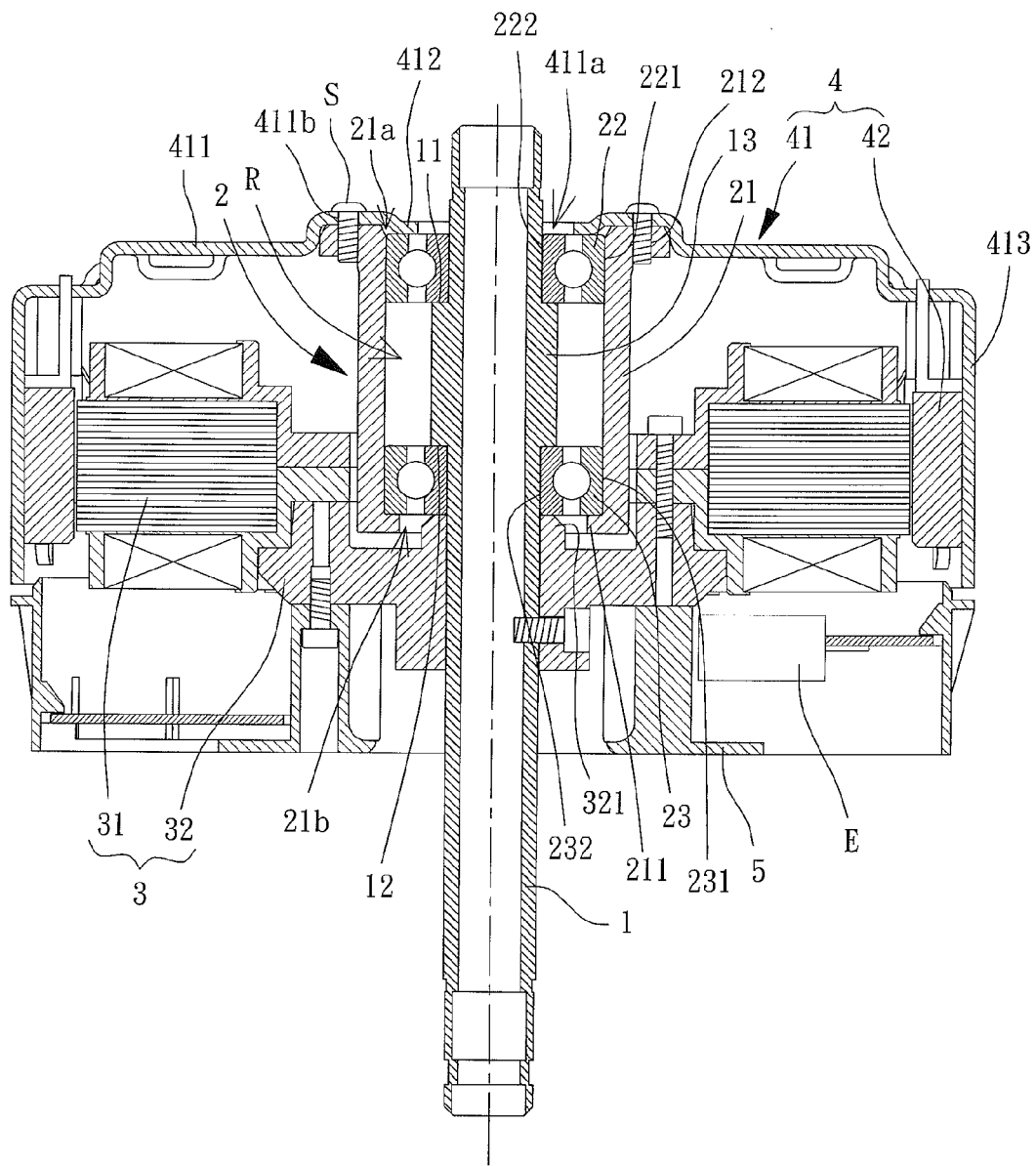
FIG. 3 is a cross-sectional view of the motor of a ceiling fan in accordance with the first embodiment of the present disclosure.

Referring to FIGS. 2 and 3, the motor of a first embodiment of this disclosure is shown. Although the motor shown in these figures is an outer rotor motor, it can also be completed by an inner rotor motor and thus is not limited. Specifically, the motor of the first embodiment includes a shaft 1 and a bearing assembly 2.

The shaft 1 has a first shoulder surface 11 and a second shoulder surface 12, and the first and second shoulder surfaces 11, 12 face in opposite axial directions of the shaft 1. Preferably, a thick section 13 of the shaft 1 is formed, and the first and second shoulder surfaces 11, 12 are two axial end faces of the thick section 13. Specifically, this thick section 13 can be completed by an annular protrusion integrally extending outward. However, the thick section 13 can also be provided by a ring mounted on the shaft 1.

Figure 4:
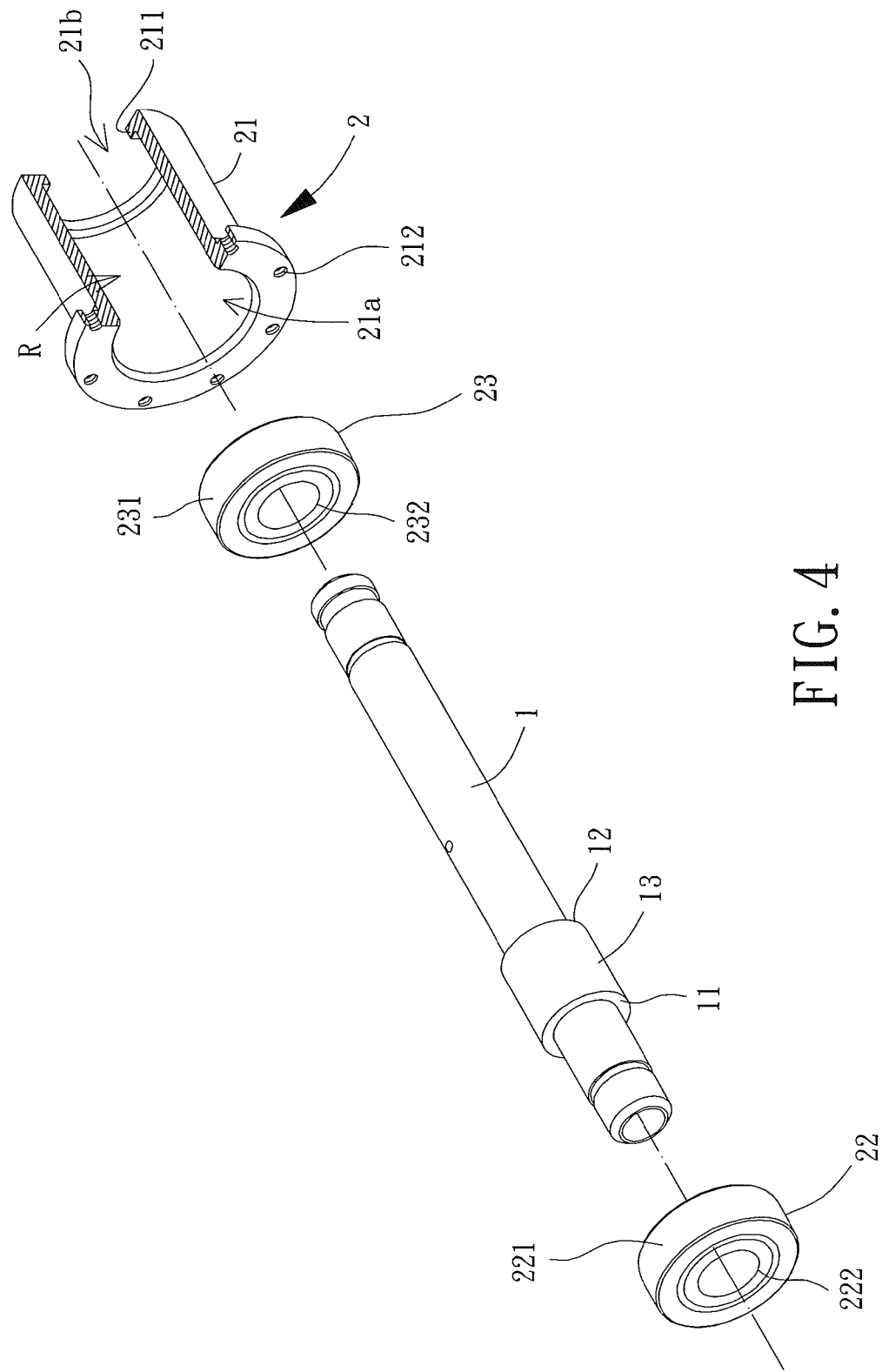
FIG. 4 is a perspective and exploded view of a combination of a shaft and a bearing assembly of the motor.

Please refer to FIG. 4 as well. The bearing assembly 2 includes a bearing sleeve 21, which receives a first bearing 22 and a second bearing 23. The first and second bearings 22, 23 are adapted to support the shaft 1 and are respectively positioned by the first and second shoulder surfaces 11, 12. Particularly, the first shoulder surface 11 abuts against an inner ring 222 of the first bearing 22, and the second shoulder surface 12 abuts against an inner ring 232 of the second bearing 23. The bearing sleeve 21 has a receiving room "R" inside, and both first and second bearings 22, 23 are received in the receiving room "R" and abut against an inner periphery of the bearing sleeve 21. Furthermore, the bearing sleeve 21 has a first opening 21a and a second opening 21b respectively formed at two opposite ends of the bearing sleeve 21 and communicating with the receiving room "R." With the above structure, the shaft 1 penetrates the receiving room "R" by extending through the first opening 21a, the first bearing 22, the second bearing 23, and the second opening 21b in order. Specifically, in the combination of the shaft 1 and the bearing assembly 2, the first shoulder surface 11 faces the first opening 21a, the second shoulder surface 12 faces the second opening 21b, the first bearing 22 is disposed between the first opening 21a and the first shoulder surface 11, and the second bearing 23 is disposed between the second opening 21b and the second shoulder surface 12.

The motor of the first embodiment further includes a stator 3 and a rotor 4. The stator 3 has a core 31 directly or indirectly coupling with the shaft 1. The rotor 4 has a housing 41 connecting with the bearing sleeve 21. The housing 41 may be adapted to couple with blades of the ceiling fan.

The housing 41 has a base 411 and a connecting portion 412, with the first shoulder surface 11 facing the base 411 and located between the base 411 and the second shoulder surface 12. In other words, since the first and second shoulder surfaces 11, 12 face the first and second openings 21a, 21b respectively, the first shoulder surface 11, the first opening 21a and the first bearing 22 are close to the base 411, and the second shoulder surface 12, the second opening 21b and the second bearing 23 are away from the base 411. The center of the base 411 has a through hole 411a aligning with the first and second openings 21a, 21b in the axial direction of the shaft 1, so that the shaft 1 can penetrate the base 411 via the through hole 411a. In this embodiment, the connecting portion 412 connects with an inner edge of the base 411, and this inner edge defines the through hole 411a. Furthermore, the connecting portion 412 extends from the base 411 into the first opening 21a and abuts against the first bearing 22. Moreover, the bearing sleeve 21 has an annular flange 211 radially extending inwards to the shaft 1 and defining the second opening 21b, to abut against the second bearing 23.

Specifically, the first bearing 22 has an outer ring 221 and the inner ring 222, and, similarly, the second bearing 23 also has an outer ring 231 and the inner ring 232. The bearing sleeve 21 couples with outer peripheries of the outer rings 221, 231, and the shaft 1 extends through the inner rings 222, 232, with the first shoulder surface 11 abutting against and positioning the inner ring 222 of the first bearing 22, and with the second shoulder surface 12 abutting against and positioning the inner ring 232 of the second bearing 23. The connecting portion 412 abuts against the outer ring 221 of the first bearing 22, so that the first bearing 22 is sandwiched between the connecting portion 412 and the first shoulder surface 11. On the other hand, the annular flange 211 abuts against the outer ring 231 of the second bearing 23, so that the second bearing 23 is sandwiched between the annular flange 211 and the second shoulder surface 12. Namely, the first shoulder surface 11 and the connecting portion 412 clamp the first bearing 22, and the second shoulder surface 12 and the annular flange 211 clamp the second bearing 23.

Particularly, the bearing sleeve 21 may have a first coupling portion 212, while the base 411 has a second coupling portion 411b aligned with the first coupling portion 212 for the combination of the bearing sleeve 21 and housing 41. In this embodiment, the first coupling portion 212 is arranged adjacent to the first opening 21a of the bearing sleeve 21 and includes a plurality of holes, and the second coupling portion 411b includes a plurality of through holes aligning with the holes of the first coupling portion 212 respectively. A plurality of fixing members "S" extends through the through holes and is firmly coupled with the walls of the holes of the first coupling portion 212. Alternatively, the way for the first and second coupling portions 212, 411b to combine with each other can also be completed by welding, a hooking dovetail, or any other conventional method to avoid the housing 41 disengaging from the bearing sleeve 21.

The housing 41 may further include an annular wall 413 connecting with an outer edge of the base 411, and the rotor 4 has a permanent magnet module 42 connecting with an inner surface of the annular wall 413. The permanent magnet module 42 has a pole face facing the core 31 and spaced from the core 31 by an air gap. Therefore, in operation, the outer rings 221, 231 of the first and second bearings 22, 23 rotate with the bearing sleeve 21 and the rotor 4, and the inner rings 222, 232 of the first and second bearings 22, 23 maintain steady with the stator 3 and the shaft 1.

With the above illustrated structures, when an assembly process for combining the bearing assembly 2 and the shaft 1 of the first embodiment of the disclosed motor is performed, two ends of the shaft 1 is extended through the first and second bearings 22, 23 respectively and thus abuts against the inner rings 222, 232 by the first and second shoulder surfaces 11, 12. The bearing sleeve 21 is then coupled to the outer rings 221, 231, with the annular flange 211 abutting against the outer ring 231 of the second bearing 23. Finally, the housing 41 couples with the bearing sleeve 21, and, thus, the connecting portion 412 abuts against the outer ring 221 of the first bearing 22. Therefore, with the first shoulder surface 11 and the connecting portion 412 axially clamping the first bearing 22, and with the second shoulder surface 12 and the annular flange 211 axially clamping the second bearing 23, the first and second bearings 22, 23 can be firmly positioned in the motor. Accordingly, the inner rings 222, 232 do not have to couple with the shaft 1 by a press fit.

Additionally, the core 31 of the stator 3 may connect to a seat 5 via a connecting seat 32, with an electronic element "E," such as a capacitor, a resistor, an inductor, a coil, a transformer, a driving device or a sensing device, disposed close to the seat 5. The driving device may be an integrated circuit (IC) chip, and the sensing device may be a Hall sensor. Specifically, if the electronic element "E" is a capacitor, which can be a large size since the motor for ceiling fan may need considerable power, the capacitor should be laid down for decreasing the height of the motor, with a longitudinal direction of the capacitor extending in a direction parallel to a radial direction of the shaft 1. Besides, the connecting seat 32 may further have a protrusion 321 for supporting the inner ring 232 of the second bearing 23, to lower the weight pressure upon the annular flange 211 and thus to ensure that the second bearing is stably sandwiched between the annular flange 211 and the second shoulder surface 12.

In practical use, the shaft 1 is fixed to a predetermined object, such as a ceiling. The seat 5 is located in a position lower than the predetermined object, and the rotor 4 is disposed between the predetermined object and the seat 5. In other words, the rotor 4 is in an upper position, and the seat 5 is in a lower position and spaced from the predetermined object by a predetermined distance, so that the heat generated by the motor does not cumulate in a position between the predetermined object and the seat 5.

Figure 5:
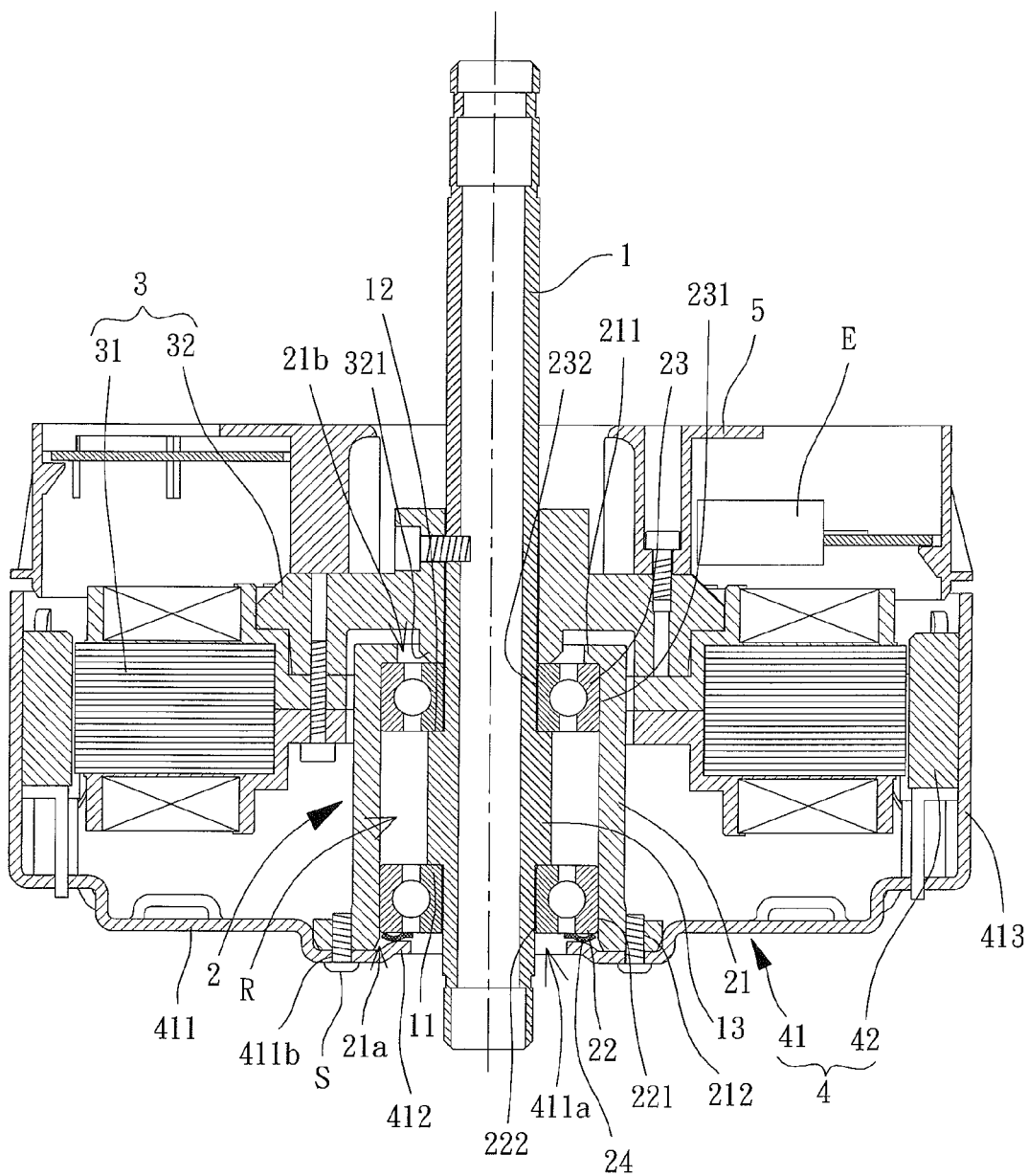
FIG. 5 is a cross-sectional view of the motor mounted to a predetermined object in a reverse orientation.

Alternatively, referring to FIG. 5, the seat 5 may be located in an upper position, and the rotor 4 may be located in a lower position and spaced from the predetermined object by a predetermined distance. With this arrangement, a space between the predetermined object and the fan coupled to the rotor 4 for airflow to pass through is thus ensured. Therefore, the ceiling fan may have a high air-driving efficiency.

Moreover, referring to FIG. 5 again, the bearing assembly 2 may further include a buffer member 24 between the connecting portion 412 and the first bearing 22, with two opposite sides of the buffer member 24 abutting against the connecting portion 412 and the first bearing 22 respectively. The buffer member 24 can be a wave-formed washer, a plate spring, a plastic ring, a C-ring, or any other elastic structure able to serve as a pressure buffer between the connecting portion 412 and the first bearing 22. Therefore, the buffer member 24 can effectively damp the vibration from the rotor 4 in operation, and thus prevents the stator 3 or members connected to the shaft 1 (such as the circuit board) from damage due to vibration, which could be transmitted to the shaft 1 through the bearing assembly 2. Furthermore, the buffer member 24 can also compensate a tolerance-caused gap between the connecting portion 412 and the first bearing 22 and press the first bearing 22 to prevent the first bearing 22 from rotation relative to the bearing sleeve 21.

Figure 6:
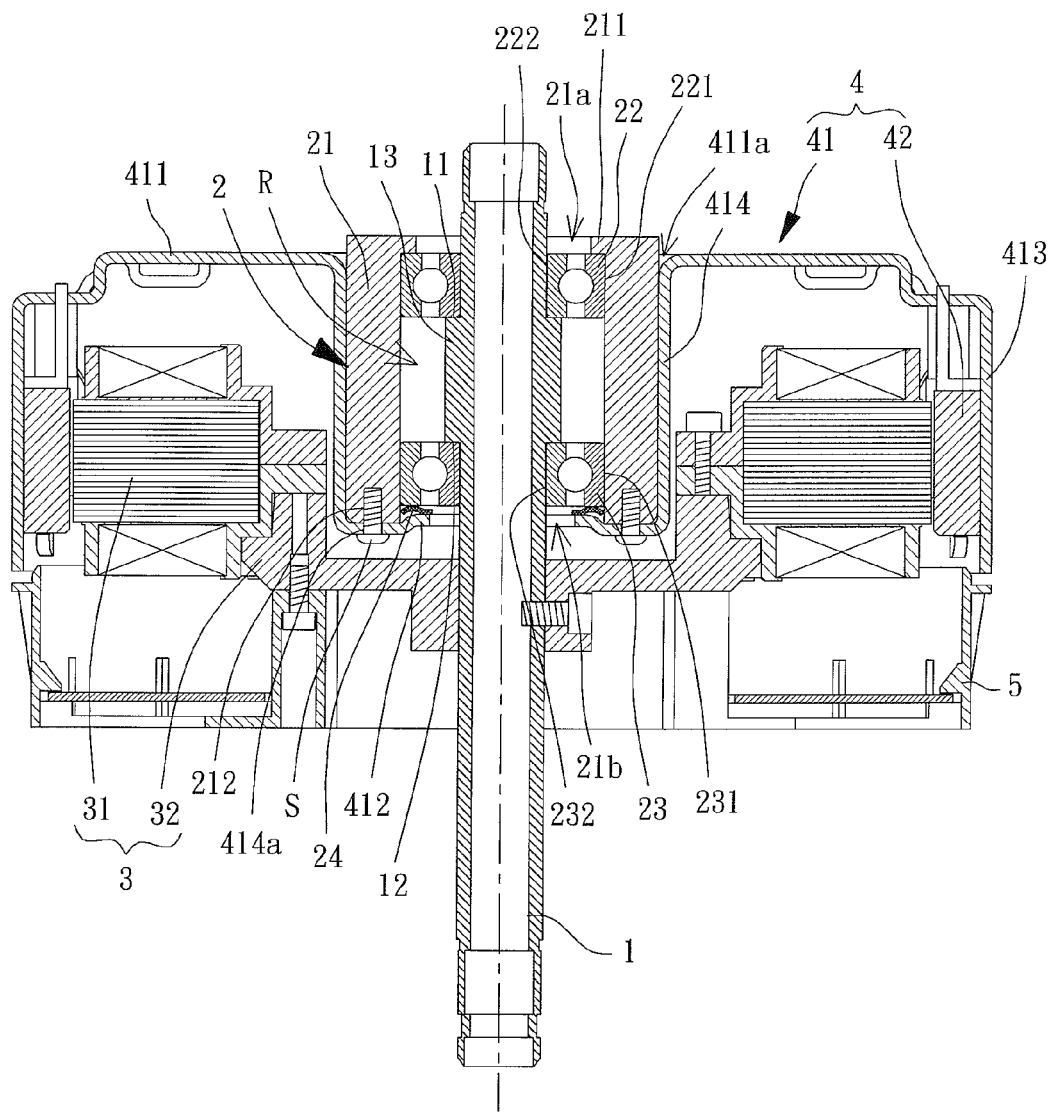
FIG. 6 is a cross-sectional view of a motor of a ceiling fan in accordance with a second embodiment of the present disclosure.

Referring to FIG. 6, the motor of a second embodiment of this disclosure is shown. Similar to the those of the first embodiment, the housing 41 also includes a base 411 and a connecting portion 412, and the first shoulder surface 11 also faces the base 411. Thus, the first shoulder surface 11, the first opening 21a of the bearing sleeve 21 and the first bearing 22 are also adjacent to an end of the bearing sleeve 21 close to the base 411, and the second shoulder surface 12, the second opening 21b and the second bearing 23 are also adjacent to another end of the bearing sleeve 21 away from the base 411. However, in this embodiment, instead of connecting to the connecting portion 412 directly, the housing 41 further includes an extending portion 414, and the inner edge of the base 411 connects to the connecting portion 412 via the extending portion 414. The extending portion 414 extends in an axial direction of the shaft 1 from the base 411 to the second opening 21b of the bearing sleeve 21, and the connecting portion 412 couples with an end of the extending portion 414 away from the base 411. Specifically, the connecting portion 412 in this embodiment extends into the second opening 21b and abuts against the second bearing 23. Besides, the annular flange 211 of the bearing sleeve 21 is arranged to radially extend inwards to the shaft 1 and define the first opening 21a, to abut against the first bearing 22. Accordingly, the connecting portion 412 abuts against the outer ring 231 of the second bearing 23, so that the second bearing 23 is sandwiched between the connecting portion 412 and the second shoulder surface 12. On the other hand, the annular flange 211 abuts against the outer ring 221 of the first bearing 22, so that the first bearing 22 is sandwiched between the annular flange 211 and the first shoulder surface 11. Namely, the first shoulder surface 11 and the annular flange 211 clamp the first bearing 22, and the second shoulder surface 12 and the connecting portion 412 clamp the second bearing 23.

In comparison to the first embodiment, the second bearing 23 of this embodiment is supported by the housing 41 which may be structurally stronger than the bearing sleeve 21 and able to hold a heavier motor. Thus, the weight of the motor of this embodiment can be larger than that of the first embodiment.

In this embodiment, instead of the second coupling portion 411b of the base 411 in the first embodiment, a third coupling portion 414a is formed at the extending portion 414. Besides, the first coupling portion 212 is arranged adjacent to the second opening 21b of the bearing sleeve 21 and aligned with the third coupling portion 414a for the combination of the bearing sleeve 21 and the housing 41. Specifically, the first coupling portion 212 includes a plurality of holes, and the third coupling portion 414a includes a plurality of through holes aligning with the holes of the first coupling portion 212 respectively. A plurality of fixing members "S" extends through the through holes and is firmly coupled with the walls of the holes of the first coupling portion 212. Alternatively, the way for the first and second coupling portions 212, 411b to combine with each other can also be completed by welding, a hooking dovetail, tenoning or any other conventional method to avoid the housing 41 disengaging from the bearing sleeve 21. Preferably, the extending portion 414 abuts against the outer periphery of the bearing sleeve 21, to enhance the structural strength of the combination of the housing 41 and the bearing sleeve 21.

Additionally, the bearing assembly 2 may also include a buffer member 24 between the connecting portion 412 and the second bearing 23, with two opposite sides of the buffer member 24 abutting against the connecting portion 412 and the second bearing 23 respectively. The buffer member 24 can be a wave-formed washer, a plate spring, a plastic ring, a C-ring, or any other elastic structure able to serve as a pressure buffer between the connecting portion 412 and the second bearing 23. Therefore, the buffer member 24 can effectively damp the vibration from the rotor 4 in operation, and thus prevents the stator 3 or members connected to the shaft 1 from damage due to the vibration, which could be transmitted to the shaft 1 through the bearing assembly 2. Furthermore, the buffer member 24 can also compensate a tolerance-caused gap between the connecting portion 412 and the second bearing 23 and press the second bearing 23 to prevent the second bearing 23 from rotation relative to the bearing sleeve 21.

With the above illustrated structures, when an assembly process for combining the bearing assembly 2 and the shaft 1 of the second embodiment of the disclosed motor is performed, two ends of the shaft 1 is extended through the first and second bearings 22, 23 respectively and thus abuts against the inner rings 222, 232 by the first and second shoulder surfaces 11, 12. The bearing sleeve 21 is then coupled to the outer rings 221, 231, with the annular flange 211 abutting against the outer ring 221 of the first bearing 22. Finally, the housing 41 couples with the bearing sleeve 21, and, thus, the connecting portion 412 abuts against the outer ring 231 of the second bearing 23. Therefore, with the first shoulder surface 11 and the annular flange 211 axially clamping the first bearing 22, and with the second shoulder surface 12 and the connecting portion 412 axially clamping the second bearing 23, the first and second bearings 22, 23 can be firmly positioned in the motor. Accordingly, the inner rings 222, 232 do not have to couple with the shaft 1 by a press fit.

Figure 7:
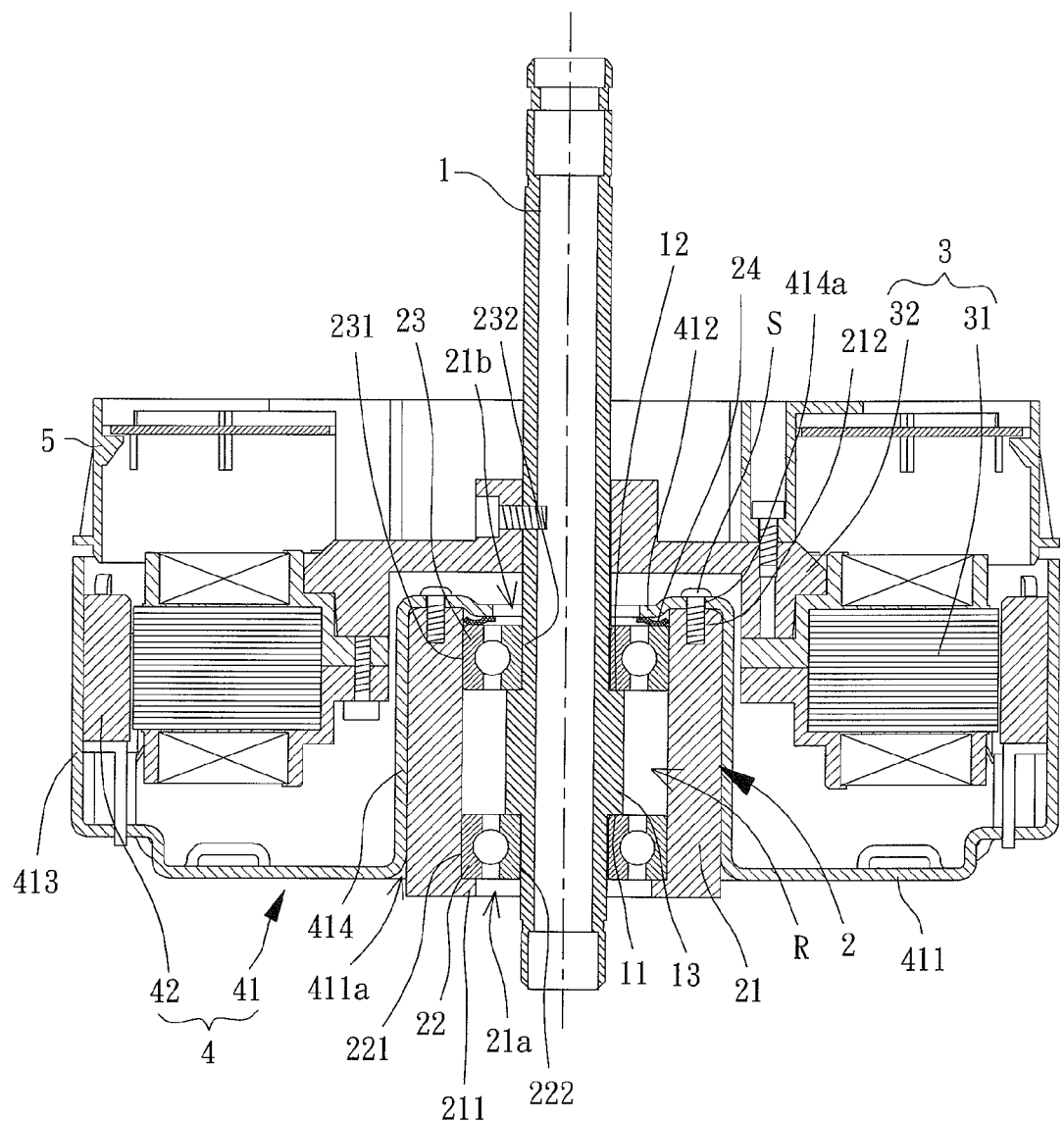
FIG. 7 is a cross-sectional view of the motor mounted to a predetermined object in a reverse orientation.

In the practical use, the shaft 1 of this embodiment is also fixed to the predetermined object such as the ceiling. The seat 5 is in a lower position, and the rotor 4 is in an upper position. Alternatively, as shown in FIG. 7, the seat 5 may be located in an upper position, and the rotor 4 may be located in a lower position.

Figure 8:
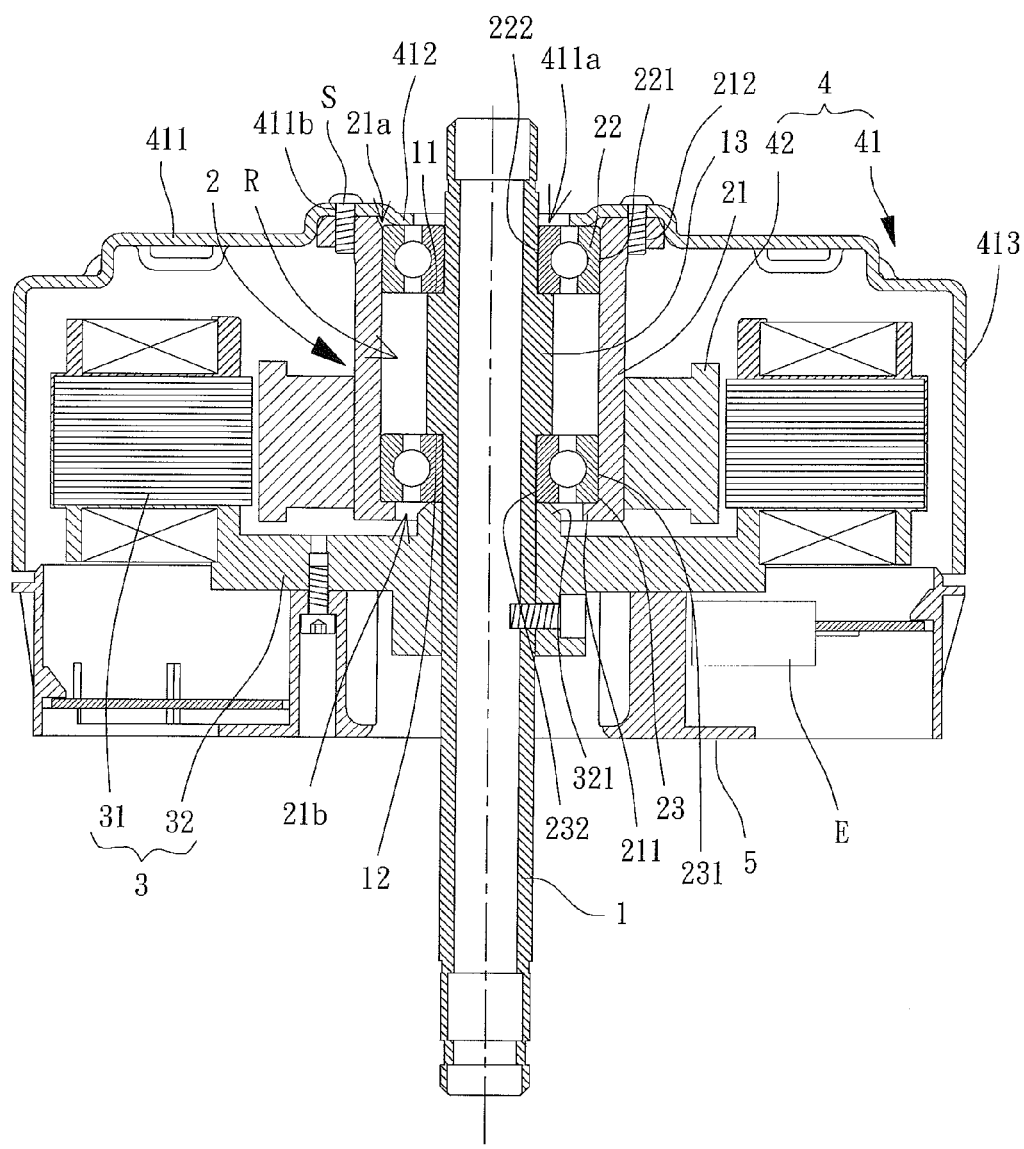
FIG. 8 is a cross-sectional view of a motor of a ceiling fan in accordance with a third embodiment of the present disclosure.

Referring to FIG. 8, the motor of a third embodiment of this disclosure is shown. Similar to the those of the first embodiment, the housing 41 also includes a base 411, and the first shoulder surface 11 also faces the base 411. Thus, the first shoulder surface 11, the first opening 21a of the bearing sleeve 21 and the first bearing 22 are also adjacent to an end of the bearing sleeve 21 close to the base 411, and the second shoulder surface 12, the second opening 21b and the second bearing 23 are also adjacent to another end of the bearing sleeve 21 away from the base 411. However, in this embodiment, the motor is an inner rotor motor, the permanent magnet module 42 of the rotor 4 couples with the bearing sleeve 21, the stator 3 fixes to the shaft 1, and the permanent magnet module 42 also has a pole face facing the core 31. In operation, the outer rings 221, 231 of the first and second bearings 22, 23, as well as the permanent magnet module 42, rotate with the bearing sleeve 21, and the inner rings 222, 232 of the first and second bearings 22, 23 maintain steady with the stator 3 and the shaft 1. Accordingly, the motor of the disclosure can be either an outer rotor motor or an inner rotor motor.

In sum, the feature of the disclosed motor lies in that: the shaft 1 couples with the bearing assembly 2, the shaft 1 has the first and second shoulder surfaces 11, 12, the bearing assembly 2 includes a bearing sleeve 21 receiving the first and second bearings 22, 23, the shaft 1 is supported by the first and second bearings 22, 23, an outer periphery of the bearing sleeve 21 connects with the rotor 4, the rotor 4 has the housing 41 including the connecting portion 412, and the bearing sleeve 21 has the annular flange 211. Particularly, the connecting portion 412 and the first shoulder surface 11 clamp the first bearing 22, and the annular flange 211 and the second shoulder surface 12 clamp the second bearing 23. Alternatively, the connecting portion 412 and the second shoulder surface 12 clamp the second bearing 23, and the annular flange 211 and the first shoulder surface 11 clamp the first bearing 22.

Accordingly, the inner rings 222, 232 of the first and second bearings 22, 23 do not have to press-fittingly couple with the shaft 1, since the bearing sleeve 21 and the housing 41 can firmly position the first and second bearings 22, 23 for assembling the bearing assembly 2. Moreover, the stator 3 is arranged around the shaft 1, and the rotor 4 is coupled to the stator 3 through the shaft 1 and the bearing assembly 2.

In comparison with the conventional motor 9 of a ceiling fan, whose stator 91 and rotor 92 couple with each other via the bearing 924, and, thus, the shaft 913 has to combine with the bearing 924 by a press fit, it is unnecessary for the first and second bearings 22, 23 of the present disclosure to couple with the shaft 1 by a press fit, since the stator 3 and the rotor 4 couple with each other via the shaft 1 and the bearing assembly 2. As a result, a special machine or a time-consumptive procedure for producing huge pressure to perform the press fit combination is not required. Thus, the process for manufacturing the motor is simplified.

Furthermore, with the buffer member 24 disposed between the connecting portion 412 and the first bearing 22 or the second bearing 23, the buffer member 24 can effectively damp the vibration from the rotor 4 in operation, and thus prevents the stator 3 or members connected to the shaft 1 from damage due to the vibration, which could be transmitted to the shaft 1 through the bearing assembly 2. Besides, the buffer member 24 can also compensate a tolerance-caused gap between the connecting portion 412 and the first bearing 22 or the second bearing 23 and press the first bearing 22 or the second bearing 23 to prevent the first bearing 22 or the second bearing 23 from rotation relative to the bearing sleeve 21. Therefore, the failure rate of the members connected with the shaft 1 can be largely lowered, and, thus, the lifetime of the disclosed motor is efficiently enlarged.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor of a ceiling fan, comprising:
    a shaft having a first shoulder surface and a second shoulder surface facing in opposite axial directions of the shaft, with the shaft coupling with a stator;
    a bearing sleeve receiving a first bearing and a second bearing for supporting the shaft, with an annular flange formed at an end of the bearing sleeve, wherein the annular flange and the second shoulder surface clamp and position the second bearing;
    a rotor having a housing coupling with the bearing sleeve, with the housing having a connecting portion and a base, wherein the connecting portion and the first shoulder surface clamp and position the first bearing, with the first shoulder surface facing the base and disposed between the base and the second shoulder surface; and
    a buffer member arranged between the connecting portion and the first bearing, with two opposite sides of the buffer member abutting against the connecting portion and the first bearing respectively.

2. The motor of the ceiling fan as claimed in claim 1, wherein the shaft has a thick section, and the first and second shoulder surfaces are two ends faces of the thick section.

3. The motor of the ceiling fan as claimed in claim 1, wherein each of the two bearings has an inner ring and an outer ring, the bearing sleeve connects with outer peripheries of the outer rings, and the shaft extends through the inner rings.

4. The motor of the ceiling fan as claimed in claim 3, wherein the bearing sleeve has a receiving room inside, both of the two bearings are received in the receiving room, the bearing sleeve further has a first opening and a second opening respectively formed at two opposite ends of the bearing sleeve and communicating with the receiving room, the first shoulder surface faces the first opening, and the second shoulder surface faces the second opening.

5. The motor of the ceiling fan as claimed in claim 4, wherein a center of the base has a through hole aligning with the first and second openings in the axial direction of the shaft.

6. The motor of the ceiling fan as claimed in claim 5, wherein the connecting portion connects with the base, the first shoulder surface abuts against the inner ring of the first bearing, the second shoulder surface abuts against the inner ring of the second bearing, the connecting portion abuts against the outer ring of the first bearing, and the annular flange abuts against the outer ring of the second bearing.

7. The motor of the ceiling fan as claimed in claim 6, wherein the inner edge of the base with which the connecting portion connects defines the through hole, the connecting portion extends from the base into the first opening and abuts against the first bearing, and the annular flange defines the second opening and radially extends inwards to the shaft to abut against the second bearing.

8. A motor of a ceiling fan, comprising:
    a shaft having a first shoulder surface and a second shoulder surface facing in opposite axial directions of the shaft, with the shaft coupling with a stator;
    a bearing sleeve receiving two bearings for supporting the shaft, with an annular flange formed at an end of the bearing sleeve, wherein the annular flange and the second shoulder surface clamp and position one of the two bearings; and
    a rotor having a housing coupling with the bearing sleeve, with the housing having a connecting portion, wherein the connecting portion and the first shoulder surface clamp and position another one of the two bearings;
    wherein the bearing sleeve has a first coupling portion, and wherein the base has a second coupling portion aligned with the first coupling portion to combine the housing with the bearing sleeve.

9. The motor of the ceiling fan as claimed in claim 8, wherein the bearing sleeve has a first opening and a second opening respectively formed at two opposite ends of the bearing sleeve, the first coupling portion is arranged adjacent to the first opening and has a plurality of holes, the second coupling portion has a plurality of through holes aligning with the plurality of holes of the first coupling portion respectively, and a plurality of fixing members extends through the plurality of through holes and is firmly coupled with the walls of the plurality of holes of the first coupling portion.

10. The motor of the ceiling fan as claimed in claim 8, wherein the shaft has a thick section, and the first and second shoulder surfaces are two ends faces of the thick section.

11. The motor of the ceiling fan as claimed in claim 8, wherein the bearing sleeve has a receiving room inside, both of the two bearings are received in the receiving room, the bearing sleeve further has a first opening and a second opening respectively formed at two opposite ends of the bearing sleeve and communicating with the receiving room, the first shoulder surface faces the first opening, and the second shoulder surface faces the second opening.

12. A motor of a ceiling fan, comprising:
    a shaft having a first shoulder surface and a second shoulder surface facing in opposite axial directions of the shaft, with the shaft coupling with a stator;
    a bearing sleeve receiving two bearings for supporting the shaft, with an annular flange formed at an end of the bearing sleeve, wherein the annular flange and the second shoulder surface clamp and position one of the two bearings; and
    a rotor having a housing coupling with the bearing sleeve, with the housing having a connecting portion and a base, wherein the connecting portion and the first shoulder surface clamp and position another one of the two bearings, and a center of the base has a through hole extending in the axial directions of the shaft;

wherein the housing has an extending portion connecting with an inner edge of the base, the extending portion extends in the axial directions of the shaft from the base to couple with the connecting portion.

13. The motor of the ceiling fan as claimed in claim 12, wherein the first shoulder surface faces the base and is disposed between the base and the second shoulder surface.

14. The motor of the ceiling fan as claimed in claim 12, wherein the two bearings are a first bearing and a second bearing, with the first bearing clamped and positioned between the annular flange and the first shoulder surface, with the second bearing clamped and positioned between the connecting portion and the second shoulder surface, wherein the bearing sleeve has a first opening and a second opening respectively formed at two opposite ends of the bearing sleeve, the connecting portion couples with an end of the extending portion away from the base, extends into the second opening, and abuts against the second bearing, and the annular flange defines the first opening and radially extends inwards from the bearing sleeve to the shaft to abut against the first bearing.

15. The motor of the ceiling fan as claimed in claim 12, wherein the two bearings are a first bearing and a second bearing, with the first bearing clamped and positioned between the annular flange and the first shoulder surface, with the second bearing clamped and positioned between the connecting portion and the second shoulder surface, wherein a buffer member is arranged between the connecting portion and the second bearing, with two opposite sides of the buffer member abutting against the connecting portion and the second bearing respectively.

16. The motor of the ceiling fan as claimed in claim 12, wherein the bearing sleeve has a first coupling portion, and the extending portion has a third coupling portion aligning with the first coupling portion to combine the housing and the bearing sleeve.

17. The motor of the ceiling fan as claimed in claim 16, wherein the bearing sleeve has a first opening and a second opening respectively formed at two opposite ends of the bearing sleeve, the first coupling portion is arranged adjacent to the second opening and has a plurality of holes, the third coupling portion has a plurality of through holes aligning with the plurality of holes of the first coupling portion respectively, and a plurality of fixing members extends through the plurality of through holes and is firmly coupled with the walls of the plurality of holes of the first coupling portion.

18. The motor of the ceiling fan as claimed in claim 12, wherein the bearing sleeve has a receiving room inside, both of the two bearings are received in the receiving room, the bearing sleeve further has a first opening and a second opening respectively formed at two opposite ends of the bearing sleeve and communicating with the receiving room, the first shoulder surface faces the first opening, and the second shoulder surface faces the second opening.

19. The motor of the ceiling fan as claimed in claim 12, wherein the bearing sleeve has a first opening and a second opening respectively formed at two opposite ends of the bearing sleeve, the first shoulder surface faces the first opening, the second shoulder surface faces the second opening, and the extending portion extends in the axial directions of the shaft from the base to the second opening.

20. The motor of the ceiling fan as claimed in claim 12, wherein the shaft has a thick section, and the first and second shoulder surfaces are two ends faces of the thick section.

* * * * *